United States Patent
Hsiao

[11] Patent Number: 6,010,119
[45] Date of Patent: Jan. 4, 2000

[54] ADJUSTABLE PNEUMATICALLY OPERATED CYLINDER

[75] Inventor: Jin-Long Hsiao, Chia-i Hsien, Taiwan

[73] Assignee: Che Hsing Co., Ltd., Chai-I Hsien, Taiwan

[21] Appl. No.: 08/964,322

[22] Filed: Nov. 4, 1997

[51] Int. Cl.[7] ........................................................ F16F 5/00
[52] U.S. Cl. ........................ 267/64.12; 267/120; 267/131
[58] Field of Search .............................. 267/64.11, 64.12, 267/64.15, 64.16, 64.18, 64.26, 131, 117, 118; 188/300, 299.1, 322.18, 322.15, 322.14, 322.21, 322.19, 297

[56] References Cited

U.S. PATENT DOCUMENTS

| | | | |
|---|---|---|---|
| 3,947,006 | 3/1976 | Bauer et al. | 267/64.11 |
| 4,052,088 | 10/1977 | Nicolls | 267/64.16 |
| 4,108,423 | 8/1978 | Skubal | 267/64.15 |
| 5,711,514 | 1/1998 | Lu | 188/322.21 |

*Primary Examiner*—Robert J. Oberleitner
*Assistant Examiner*—Mariano Sy
*Attorney, Agent, or Firm*—A & J

[57] ABSTRACT

An improved adjustable pneumatically operated cylinder for use on exercise equipment or chairs is particularly equipped with an external tube in which a piston and an adjustable piston are disposed head to head so as to form a variable air chamber therebetween. The adjustable piston is connected to an adjustment bolt which can be adjusted relatively with respect to an adjustment base fixed to the bottom of the external tube so as to make the adjustable piston move upward to reduce the size of the air chamber, resulting in the increase of the air pressure therein or downward to increase the size of the air chamber, resulting in the decrease of the air pressure. Thereby, the operation pressure of the cylinder can be properly adjusted according to practical requirements.

2 Claims, 6 Drawing Sheets

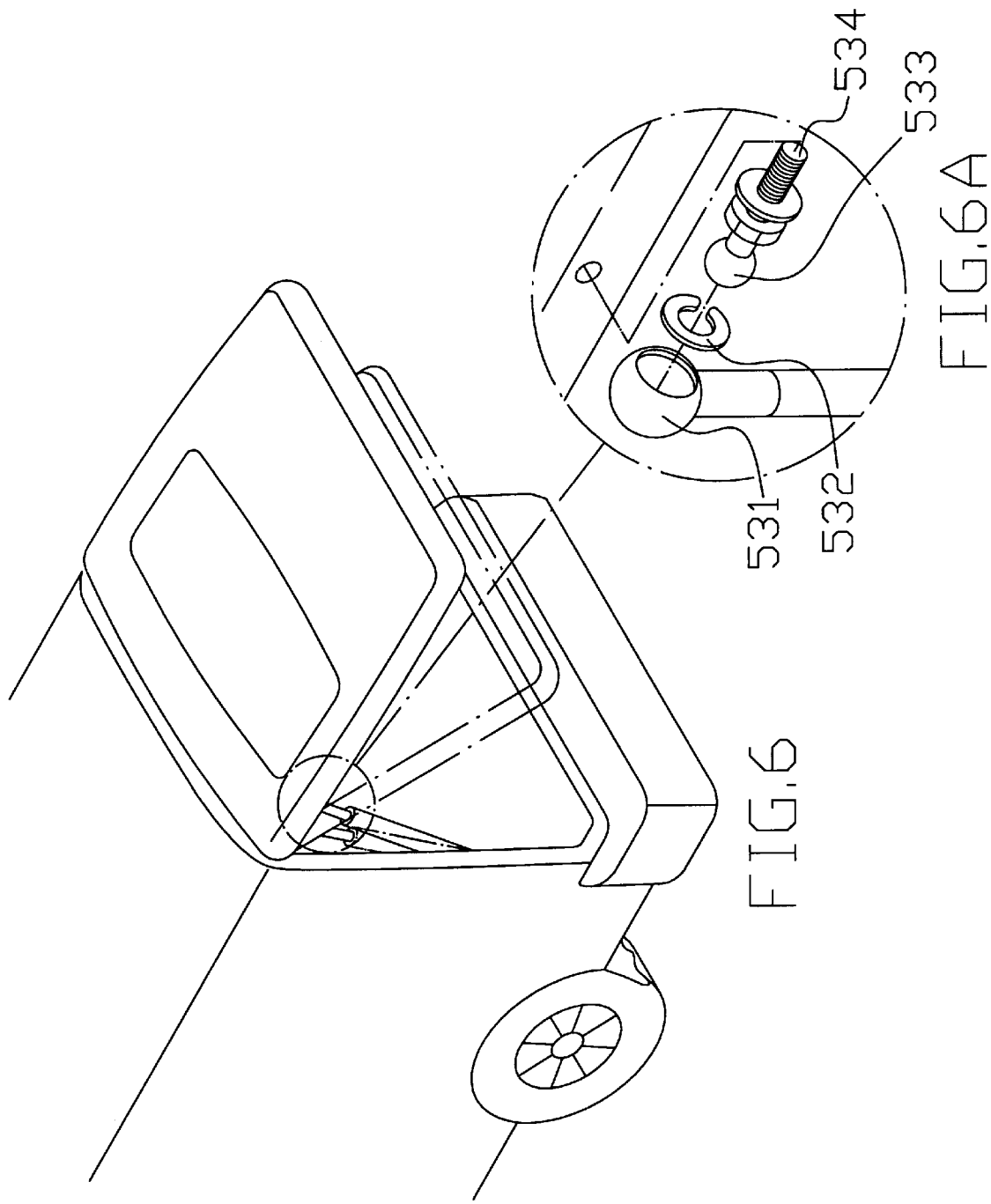

ADJUSTABLE PNEUMATICALLY OPERATED CYLINDER

BACKGROUND OF THE INVENTION

The present invention relates to an improved adjustable pneumatically operated cylinder for use on exercise equipment or chairs. The cylinder is particularly equipped with an external tube in which a piston and an adjustable piston are disposed head to head so as to form a variable air chamber therebetween. The adjustable piston is connected to an adjustment bolt which can be adjusted relatively with respect to an adjustment base fixed to the bottom of the external tube so as to make the adjustable piston move upward to reduce the size of the air chamber, resulting in the increase of the air pressure therein or downward to increase the size of the air chamber, resulting in the decrease of the air pressure. Thereby, the operation pressure of the cylinder can be properly adjusted according to practical requirements.

Pneumatic or air-operated cylinders have been widely used to serve as a damper in a wide range of applications, such as the liftable back doors of a van, exercise equipment and chairs. Conventional pneumatic cylinders are generally equipped with a fixed air chamber and the operation air pressure is not variable at all, making the working range of such cylinders narrowly limited.

SUMMARY OF THE INVENTION

Therefore, the primary object of the present invention is to provide an improved adjustable cylinder for use on exercise equipment or chairs, which is provided with an adjustable piston in connection to an adjustment bolt. An air chamber is defined between the adjustable piston and a movable piston so that the adjustment of the location of the adjustable piston results in the variation of the air pressure in the air chamber. Thus, the operation pressure of each cylinder can be properly adjusted when served as a damper, permitting the working range of the cylinder effectively expanded.

BRIEF DESCRIPTION OF THE DRAWINGS

FIGS. 6, 6A are diagrams showing the practical application of the present invention.

DETAILED DESCRIPTION OF THE PREFERRED EMBODIMENT

Figure 1:
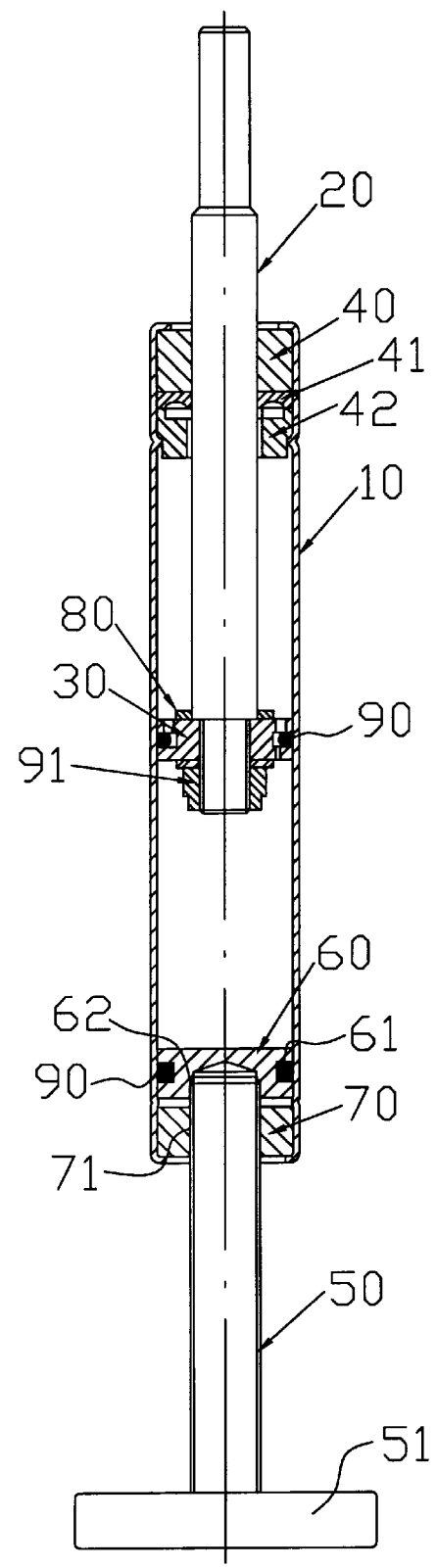
FIG. 1 is a sectional diagram showing the structural assembly of the cylinder of the present invention.

Referring to FIG. 1, the improved adjustable pneumatic cylinder of the present invention is comprised of an external tube 10, a core shaft 20, a piston 30, an upper fixing seat 40, a sealing ring 41, a lower fixing mount 42, an adjustment bolt 50, an adjustable piston 60, an adjustment base 70, a rubber washer 80, a pair of O-shaped rings 90 and a nut 91.

The piston 30 secured to the narrowed bottom end of the core shaft 20 by means of the nut 91 along with a washer. On the top side of the piston 30 is also disposed a washer 80 engaged with the core shaft 20. On the intermediate periphery of the piston 30 is disposed a groove for housing the O-shaped ring 90. The piston 30 is placed in the upper portion of the external tube 10 and the lower fixing mount 42 with the sealing ring 41 as well as the upper fixing seat 40 is integrally mounted onto the core shaft 20 and limited in position at the upper end of the external tube 10.

On the outer periphery of the adjustable piston 60 is disposed a groove 61 for housing an O ring 90 and at the bottom side of the piston 60 is defined a cavity 62 having its inner wall threaded so as to permit the adjustment bolt 50 to be engaged therewith.

The adjustable piston 60 is placed at the bottom of the external tube 10 and to the other end of the adjustment bolt 50 is secured a turning knob 51. The adjustment base 70 housed in the external tube 10 and fixed in place at the bottom thereof is provided with an innerly threaded central hole 71 for the mounting of the adjustment bolt 50 which is outerly threaded.

Figure 2:
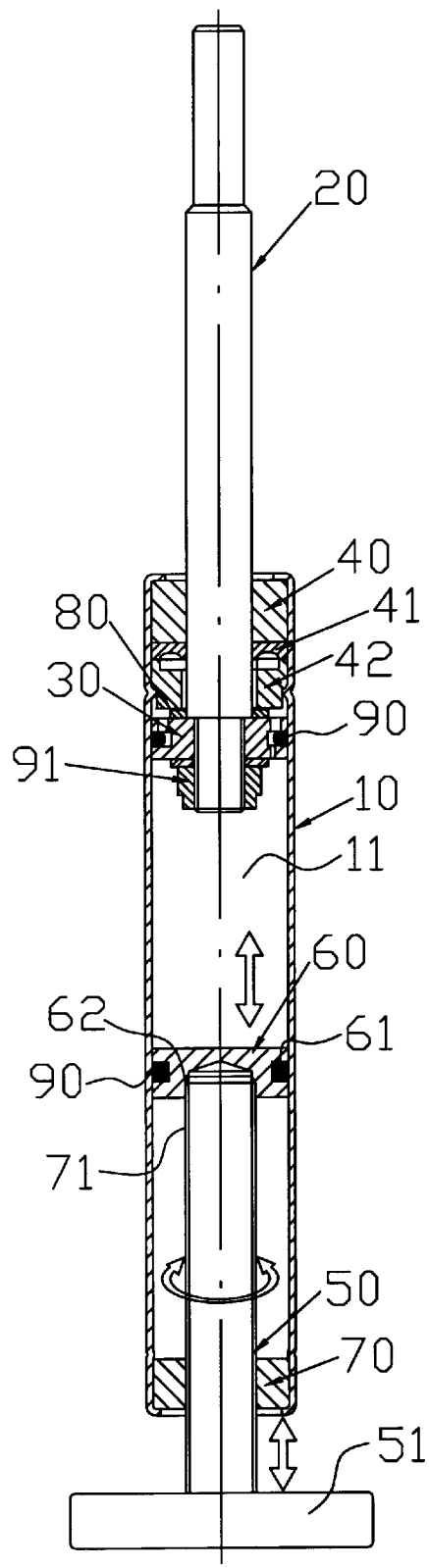
FIG. 2 is a sectional diagram showing the operational mode of the present invention.

Referring to FIG. 2, to vary the operational conditions of the cylinder of the present invention, the turning knob 51 of the adjustment bolt 50 is actuated to spin upward or downward with respect to the adjustment base 70, so does the piston 60 move along with the adjustment bolt 50 accordingly. Such an adjustment results in the variation of the volume of the air chamber 11 in the external tube 10 so as to change the air pressure inside the chamber 11. So, the force needed to operate on the core shaft 20 is accordingly changed.

Figure 3:
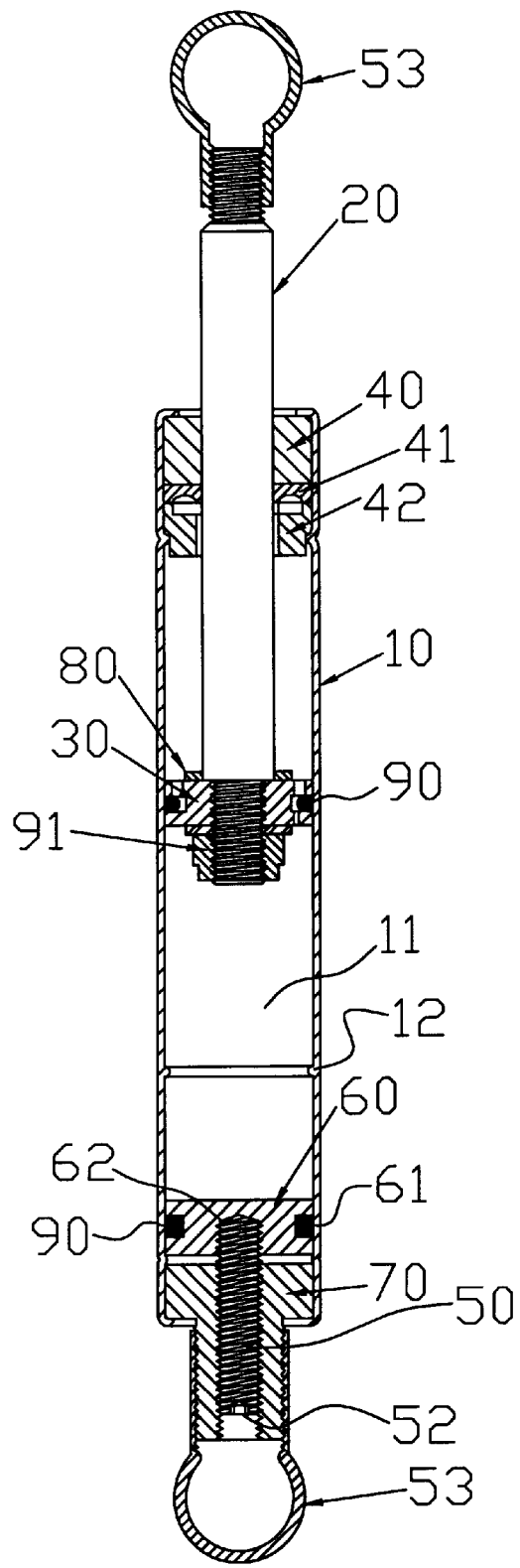
FIG. 3 is a sectional diagram showing the operation mode of another embodiment of the present invention.

Furthermore, the adjustment base 70 can be provided with a downward extension having outer threads and projected from the external tube 10 so as to permit a tubular innerly threaded universal joint 53 to be engaged with the downward extension. The adjustment base 70 can accommodate the adjustment bolt 50 having outer threads and a hexagon-shaped cavity 52 at its bottom end so that the adjustment bolt 50 can be adjusted to make the piston 60 to move upward or downward. In addition, between the piston 30 and the adjustable piston 60 and on the inner wall of the external tube 10 is disposed a peripheral flange 12 to set up an upper limit of movement of the adjustable piston 60. The upper end of the core shaft 20 is provided with a universal joint 53, as shown in FIG. 3.

Figures 4A, 4B:
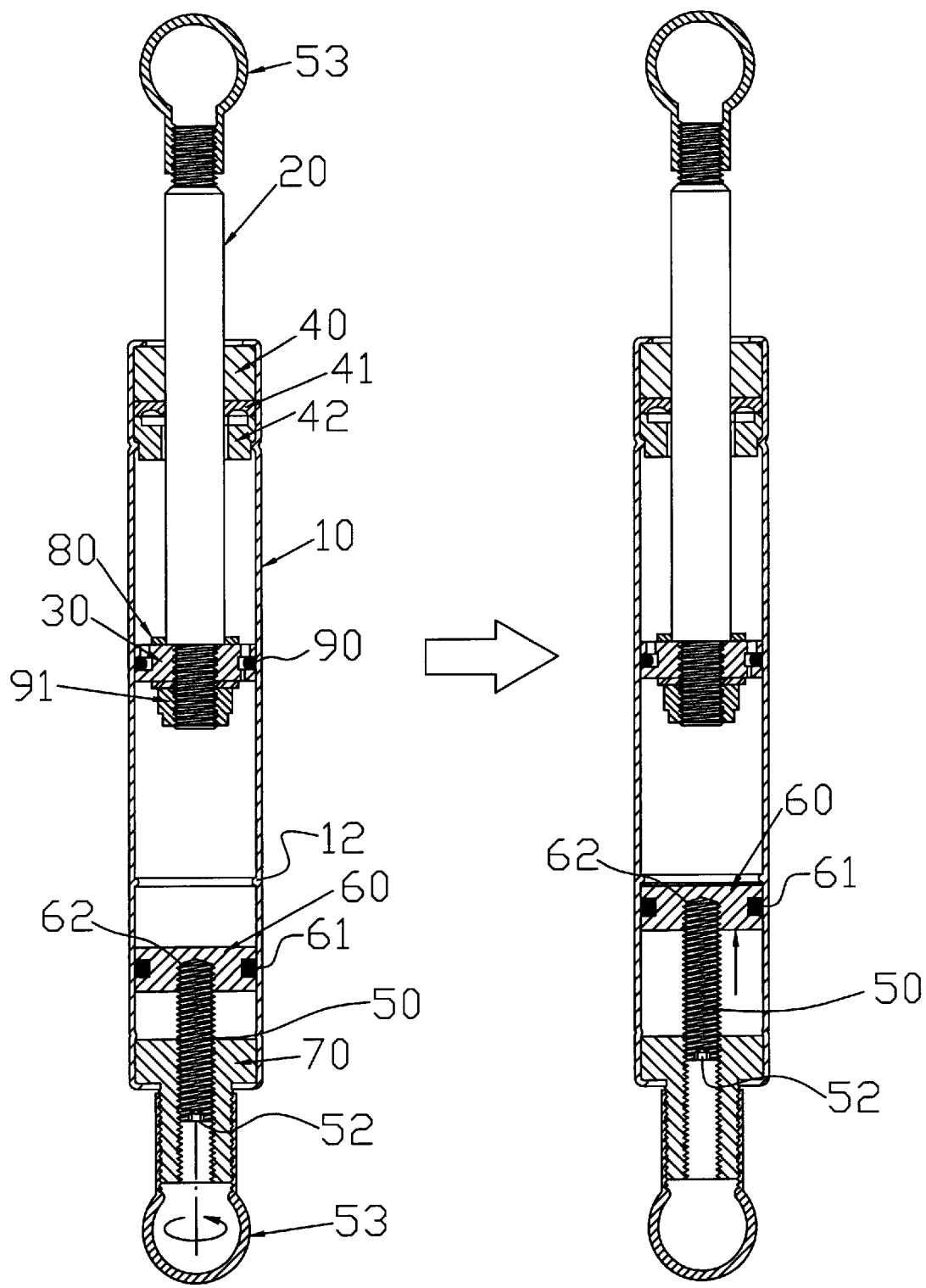
FIGS. 4A, 4B are another diagrams showing the operation mode of the second embodiment thereof.
Figure 5A:
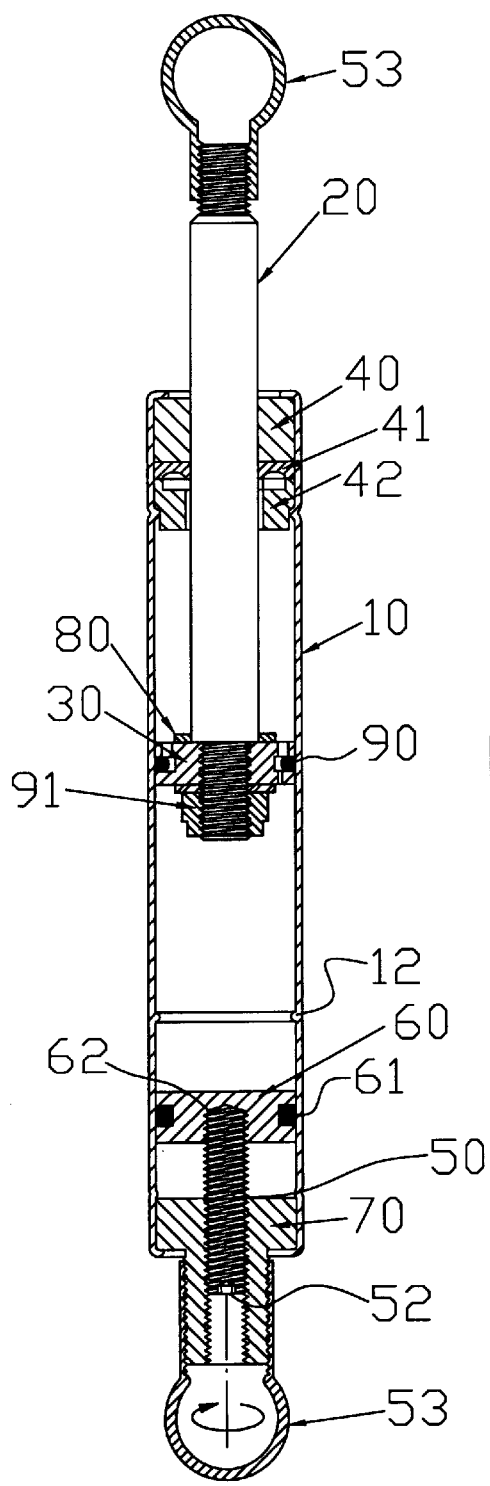
FIGS. 5A, 5B are further diagrams showing the operation mode of the second embodiment thereof.
Figure 5B:
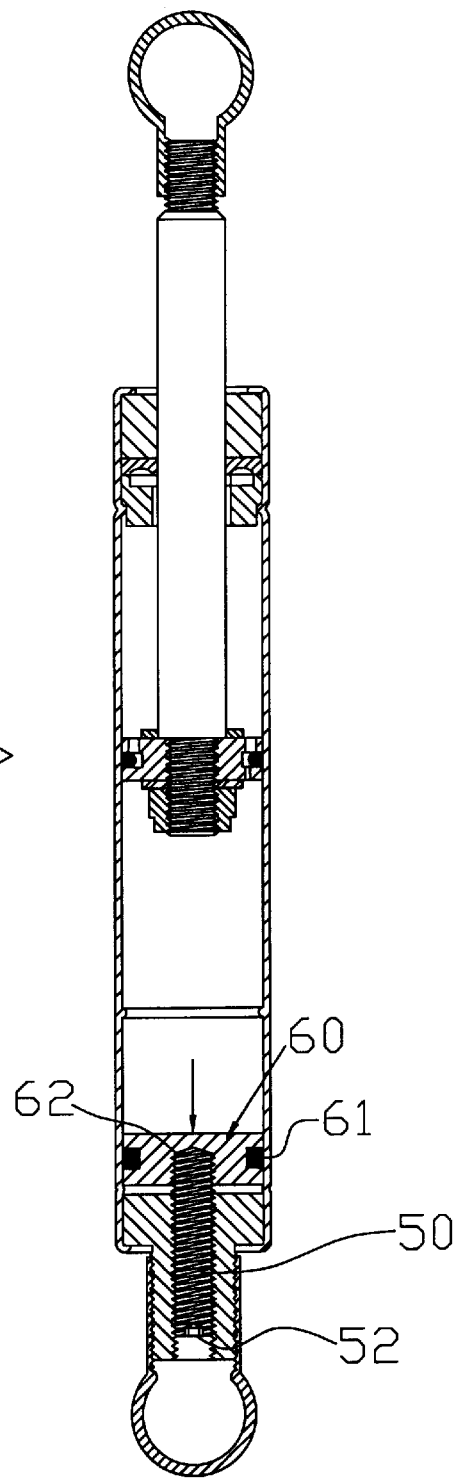

In practical operation, when the air pressure in the air chamber 11 is relatively too high in installation, the adjustable piston 60 can be adjusted to move downward by way of the spinning adjustment on the hexagon-shaped cavity 52 of the adjustment bolt 50 so as to expand the air chamber 11 of the external tube 10, resulting in the decrease of pressure in the external tube 10, as shown in FIGS. 4A and 4B. In other case, as the pressure in the air chamber is relatively too low, the adjustable piston 60 is moved in a reverse direction or upward so as to make the air chamber 11 reduced in size, causing the air pressure in the air chamber to rise accordingly, as shown in FIGS. 5A and 5B. Thereby the air pressures in the external tubes 10 can be effectively controlled to a fixed value if desired.

After proper adjustment on a cylinder of the present invention, the universal joint 53 including a ball-type mount 531, a C-shaped ring 532, a roller joint head 533 in connection to a threaded rod 534, as shown in FIG. 6A, can be engaged with an object by way of the threaded rod 534 so as to make the cylinder to serve as a damper.

I claim:

1. An adjustable pneumatically operated cylinder for use on exercise equipment or chairs, comprising an external tube, a core shaft, a piston, an upper fixing seat, a sealing ring, a lower fixing mount, an adjustment bolt, an adjustable piston, an adjustment base, a rubber washer, a pair of O-shaped rings and a nut; said piston secured to a narrowed bottom end of said core shaft by means of said nut along with a washer and being movable in said external tube; on a top side of said piston being also disposed a washer engaged with the core shaft; on an intermediate periphery of said piston being disposed a groove for housing said O-shaped ring; said piston being placed in the upper portion of said external tube and the lower fixing mount with the sealing ring as well as the upper fixing seat being integrally mounted onto the core shaft and limited in position at the upper end of the external tube; said cylinder being characterized by that said adjustment base being secured to a bottom end opposite to said upper fixing seat of said external tube; the center of said adjustment base being provided with a threaded hole so as to permit said threaded adjustment bolt to be adjustably engaged with said adjustment base with part thereof sticking into said external tube and threadedly secured to said adjustable piston at its top end; said adjustment bolt being provided with a turning knob at its bottom end so as to render said adjustment bolt with said adjustable piston to rotational move forward or backward to vary the size of air chamber defined between said movable piston and said adjustable piston in said external tube whereby the air pressure in said air chamber can be varied as a result of the change of the volume of said air chamber; said adjustment base has a downward extension protecting out of said external tube; and extension having a central through innerly threaded hole is provided with outer threads so as to permit a universal joint to be removably engaged therewith and said adjustment bolt to be adjustably housed therein; said adjustment bolt has an upper end engaged with said adjustable piston and a lower end provided with a hexagon-shaped cavity for effecting adjustment of the position of said adjustable piston in said external tube; said core shaft connected to said piston is also provided with a universal joint.

2. The adjustable pneumatically operated cylinder as claimed in claim 1, wherein said external tube is provided with a peripheral protrusion between said piston and said adjustable piston on the inner wall of said external tube so as to limit the adjustment range of said adjustable piston.

\* \* \* \* \*